Figure 1:
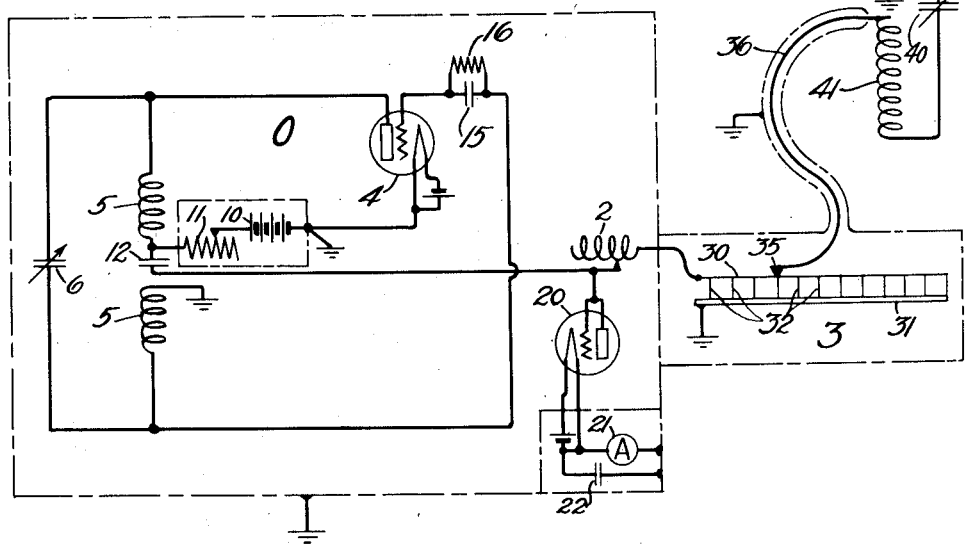

June 24, 1930.  R. A. HEISING  1,768,251

ELECTRIC WAVE TRANSMISSION DEVICE

Filed May 29, 1926

Inventor:
Raymond A. Heising.
by  E.W.Griggs  Att'y.

Patented June 24, 1930

1,768,251

UNITED STATES PATENT OFFICE

RAYMOND A. HEISING, OF MILLBURN, NEW JERSEY, ASSIGNOR TO BELL TELEPHONE LABORATORIES, INCORPORATED, OF NEW YORK, N. Y., A CORPORATION OF NEW YORK

ELECTRIC WAVE TRANSMISSION DEVICE

Application filed May 29, 1926. Serial No. 112,521.

This invention relates to electric wave transmission systems and more particularly to systems for measuring and controlling the characteristics of electric waves.

In studying the characteristics of electric waves, for example, in determining the characteristics of the field produced by electromagnetic or other waves, at one or more points, it is desirable, if not essential, to provide a source of waves of known characteristics as a standard for comparison with the waves of unknown characteristics. An important characteristic of electric waves that must nearly always be determined, is the voltage. Because, however, of the very small voltages that are ordinarily involved in the fields produced by electromagnetic waves, it is desirable to provide a comparison source of waves of readily measurable voltage with means for producing variable known attenuation of the voltage to a value of the order of the voltage of the waves to be measured.

It has heretofore been the practice to provide a local source of comparison waves and an attenuating device for causing a known attenuation of the waves from this source, and to supply the attenuated waves to a receiving circuit such, for example, as a loop antenna. A circuit of this kind is disclosed in Fig. 1 of an article by C. R. Englund in the proceedings of the Institute of Radio Engineers for February 1923 at page 29. The attenuation network is shown in detail in Fig. 3 of this article and is described as composed of pure resistances. A similar circuit is described in an article by Bown, Englund and Friis in the proceedings of the Institute of Radio Engineers for April 1923 at page 115. The circuits are shown in Figs. 2 and 4. Axel G. Jensen in an article in the Physical Review, Volume 26, second series July 1925, page 118, has described a potentiometer for producing attenuation of waves locally supplied from a comparison oscillator to a loop antenna for measuring the strength of received signal waves.

The emphasis which is at present placed upon the use and study of very high frequency (very short) waves in radio signaling makes important the provision of means for controlling and determining the characteristics of such waves.

It is an object of this invention to accurately control and quantitatively determine the characteristics of very high frequency waves.

Another object is to produce known attenuation of high frequency waves.

A specific object is to adjust and measure the voltage of waves from a high frequency source by producing known attenuation of waves of known voltage.

A feature of the invention is a wave attenuator, the attenuation of which is substantially constant with frequency.

A more specific feature is a wave attenuator having substantially only inductance.

Another specific feature is an adjustable network, the resistance and capacity of which are negligible as compared to its inductance, and which is adapted for both fine and coarse adjustments.

The invention relates broadly to the design of an attenuation network, whose attenuation is constant over a wide range of very high frequencies and to the combination of the network with other circuits. In a specific embodiment for utilizing the principles of the invention, an attenuation network, which may include one or several sections of equal or unequal characteristics, includes conductors of such material and dimensions as to have negligible resistance and so arranged that the inherent capacity between the conductors is also negligible for waves of certain desired frequencies.

Means is provided for adjustably making connection to different sections of the network, whereby different degrees of attenuation may be secured in either large or small steps. Several sections, to which connection is not ordinarily made, may be provided as a terminating impedance for the attenuator, whereby variations in the degree of attenuation for different adjustments are prevented. Other means may be used as a terminating impedance, however. The network may, in practicing the invention, be employed as an adjustable coupling element between separate circuits such as an oscillator and a loop antenna.

Figure 2:
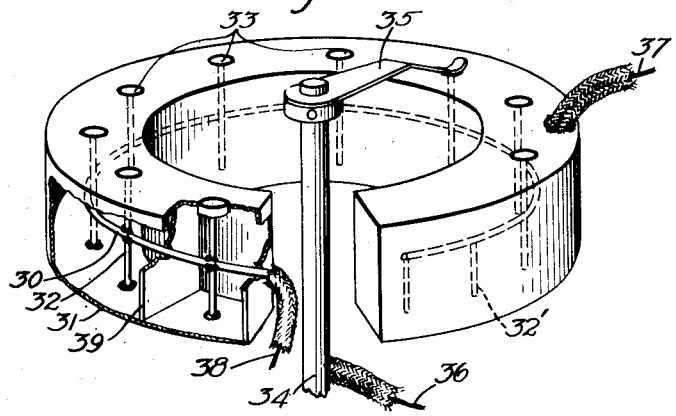

The invention is illustrated in the drawings, wherein Fig. 1 represents a high frequency attenuator associated with an oscillator and a loop antenna. Fig. 2 represents one special form of the network 3 of Fig. 1.

Referring to Fig. 1 an oscillation generator O is adapted to supply locally generated waves to an attenuator, which includes coil 2 and network 3, and hence to the loop receiving circuit 1. The generator O includes a space discharge tube 4 of the three-electrode type having an associated resonant circuit including the adjustable condenser 6 and inductances 5 connected to its anode and control electrode. By means of a blocking condenser 15 and a grid leak resistance 16 a suitable average potential is maintained upon the control electrode. Space current is supplied by battery 10 connected to the anode and cathode in series with an adjustable resistor 11 and one of the inductances 5. The cathode of the tube is connected to ground. The variable coil 2 and the variable network 3 are connected in series in the resonant circuit of oscillator O between the two inductances 5. A blocking condenser 12 is provided to prevent the coil 2 and attenuator from short circuiting the space current source 10. In shunt to the inductance 2 and attenuator 3 is the rectifier tube 20, the cathode and anode of which are in series with a voltage indicating device 21. The cathodes of tubes 4 and 20 are heated by any suitable source of current.

The coil 2 of the attenuator is designed to have substantially only inductance and may have relatively high impedance, so that by adjustment thereof the attenuation may be varied in relatively large steps as compared to the variation produced by adjustment of network 3.

The network 3 comprises conductors 30 and 31 of negligible resistance connected at intervals by conductors 32 also having negligible resistance. An adjustable contact 35 is provided and adapted to electrically engage the conductor 30, preferably at the end of each section. This contact, however, may be adapted to make continuous adjustment along the length of conductor 30 or in any other suitable manner. The contact 35 is connected by a flexible conductor 36 to the resonant loop 1 which includes the adjustable condenser 40 and the inductances 41 and 42 in series.

The network 3 is thus included not only in series with the resonant circuit of oscillator O but also in series with the resonant receiving loop circuit 1, hence this attenuator provides a direct adjustable coupling between these two resonant circuits.

The conductor 36 is surrounded by a sheath of conductive shielding material, which is connected to ground and to the shield surrounding the attenuator 3 and a second shield surrounding the oscillator O.

The shields surrounding the oscillator, the network 3 and the conductor 36 prevent electrical energy supplied by the oscillator O from reaching the loop receiving circuit 1 except by way of the network 3.

Terminals 43 and 44, for connecting other apparatus to the loop 1, are connected to the ends of inductance 42.

However, these terminals may if desired, be associated with the inductance 41 or with the opposite plates of condenser 40.

A practical form of the network 3 of Fig. 1 is illustrated in detail in Fig. 2. This network comprises the conductor 30 arranged in an arc, and conductor 31, in the shape of a curved pipe of square cross-section having closed ends, surrounding the conductor 30. The latter conductor is shown in a position concentric with and in the middle of the tube 31 but this position is not essential. The conductors 32 are spaced at equal distances along the conductor 30 and are connected to this conductor and also to the conductor 31. The conductors 32 need not, however, be equally spaced. The upper ends of the conductors 32 are provided with contact elements 33 inserted in openings in tube 31 and adapted to be electrically engaged by a conductive wiper arm 35 attached to a rotatable shaft 34 provided with a terminal conductor 36 for making electrical connection thereto. The conductor 31 is provided with an electrical terminal conductor 37 for making connection thereto. The contact elements 33 are separated from direct contact with the conductor 31 by insulating material. An input terminal for the attenuator is provided by the electrical conductor 38 connected to one end of conductor 30.

The conductor 31 not only functions as a portion of the attenuator proper, but also serves as a shield for the conductor 30 for preventing stray electrical energy from being picked up by the conductor 30. When the network includes a large number of sections and when great precision is desired additional shields may be provided between adjacent sections. For simplicity in the drawings only one such shield 39 is shown in Fig. 2. Similar shields may be placed between all sections of the network or they may all be omitted. In use, the attenuator may also be included in the additional shield as illustrated in Fig. 1 by the broken line.

The two shunt conductors 32' without associated terminal elements 33 are provided at the end of the conductor 30. These conductors provide added sections and supply a suitable terminating impedance for the attenuator such that, when the arm 34 is rotated over the several contact elements 33, variations in the attenuations per section of the attenuator, which would make accurate calibration difficult, will not be produced. Any additional number of sections, as illustrated at 32', may be provided if desired, or in certain instances the conductors 32' may be entirely omitted.

In the operation of the circuit of Fig. 1, the condenser 6 is adjusted to tune the oscillator to the frequency at which it is desired to generate oscillations. By means of condenser 40, the loop circuit 1 may also be tuned to the same frequency. The waves generated by the oscillator O are supplied to the anode and cathode of the rectifier 20 and the rectified component is caused to actuate the meter 21 to provide an indication of the voltage of waves supplied to the attenuator. The meter 21 is shunted by a by-pass condenser 22 which provides a low impedance path for the high frequency component of the rectified waves. The waves from the oscillator O are also supplied to the attenuator including inductance 2 and network 3. In view of the fact that the network 3 is adapted to produce only a relatively small range of attenuation, that is, since the inductance of the network 3 is relatively small, and because the sensitivity of the meter 21 is such that a relatively large voltage must be applied thereto in order to produce a sensible indication, the inductance 2 is provided to supplement the inductance of the network 3 so that a voltage may be supplied to the meter 21 and tube 20 which is sufficiently large to be measured with the desired degree of accuracy. Inductance 2 is preferably large relative to the network 3 and is calibrated for attenuation so that it may be adjusted to a desired value.

The attenuator 3 is so designed that it interposes substantially only an inductive reactance to waves over a relatively wide range of high frequencies. The resistance and capacity of the network are made negligible with respect to the inductance by constructing the attenuator conductors 30, 31 and 32 of good conducting material of large cross-section and by suitably spacing these conductors. The inductance of the attenuator for any given setting may thus be made substantially constant for waves of different frequencies over a wide range of high frequencies.

An attenuator of this character has important advantages, because it enables a simple method of comparison to be employed in the measurement of the strength of received waves. For example, in Fig. 1, loop 1 may be supplied with electromagnetic or radio waves and an indicating device may be connected to the terminals 43 and 44 to produce an indication of the voltage of these waves. By supplying waves from the oscillator O to the loop 1 by way of the attenuator and by adjusting the contact 35 on the attenuator until the indicating device connected to terminals 43 and 44 gives the same indication as for received radio waves, the voltage of the received radio waves may be determined, because both the voltage of waves supplied by the oscillator O and the amount of attenuation is known. The method of calculating this voltage is clearly set forth in the articles by Bown, Englund and Friis hereinbefore referred to.

Although this invention has been described in association with a specific circuit arrangement and the attenuator network has been shown as constructed in a specific manner, it is nevertheless capable of being employed in numerous other circuit arrangements, and the principles involved are applicable to various other forms of attenuating devices. The invention is accordingly to be limited only as indicated by the scope of the appended claims.

What is claimed is:

1. An attenuator which comprises separate concentrically disposed conductors of negligible resistance arranged in parallel, and a plurality of shunt conductors of negligible resistance connected to said first mentioned conductors to provide a plurality of equal sections having substantially no capacity, whereby said attenuator has substantially only inductance over a wide band of frequencies.

2. A wave attenuator for radio waves which comprises a plurality of sections consisting of concentrically disposed elements having substantially only inductance, and means for adjustably making contact to any one of said sections.

3. An attenuating device for high frequencies comprising a low resistance conductor, a casing of conducting material surrounding said conductor, said conductor and casing being electrically separated except for connections of negligible resistance at intervals along said conductor, and means for making external connection to said conductor at a plurality of points.

4. In an electric wave transmission system, a space discharge tube oscillator comprising a resonant circuit, a resonant receiving circuit, and an adjustable high frequency attenuating device consisting of concentrically disposed elements having substantially only inductance, common to both of said resonant circuits, whereby waves may be transmitted from said oscillator to said receiving circuit.

5. An attenuator network for radio frequencies having a plurality of sections comprising series and shunt impedance elements, said elements being of negligible resistance for the energy to be transmitted through them, and the length of said shunt elements being such as to maintain said series elements so spaced relative to each other that the network has substantially no capacitive reactance.

6. An attenuator network having a plurality of paths comprising conductors of low resistance for the energy to be transmitted thereby, a plurality of paths of negligible resistance connecting said first mentioned paths, and means for spacing said conductors with respect to each other, whereby the capacity of said network is negligible relatively to its inductance.

7. An attenuator network for radio frequencies comprising a plurality of equal sections of concentrically disposed elements, and means for making adjustable connection to a plurality of said sections, said network having negligible resistance and capacity compared to its inductance.

8. A plural section attenuation network for high frequencies comprising a plurality of conductors of large dimensions for the energy transmitted thereby, a plurality of conductors of negligible resistance connecting said first mentioned conductors, and means for so spacing said conductors relatively to each other that the reactance of one kind, presented by said network for energy transmitted thereby, is negligible compared to its reactance of another kind.

9. A network comprising a plurality of conductors having substantially negligible resistance, said conductors being spaced apart to have substantially negligible capacity for frequencies of the order of three megacycles, and being connected at intervals by conductors having negligible resistance.

In witness whereof, I hereunto subscribe my name this 28th day of May, A. D. 1926.

RAYMOND A. HEISING.